(12) United States Patent
Wei et al.

(10) Patent No.: US 11,096,122 B2
(45) Date of Patent: Aug. 17, 2021

(54) DEVICES AND METHODS FOR DISCONTINUOUS RECEPTION IN NEW RADIO

(71) Applicant: FG Innovation Company Limited, Tuen Mun (CN)

(72) Inventors: Chia-Hung Wei, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/676,331

(22) Filed: Nov. 6, 2019

(65) Prior Publication Data

US 2020/0077337 A1    Mar. 5, 2020

Related U.S. Application Data

(63) Continuation of application No. 16/100,659, filed on Aug. 10, 2018, now Pat. No. 10,531,385.

(60) Provisional application No. 62/544,181, filed on Aug. 11, 2017.

(51) Int. Cl.
| | |
|---|---|
| *H04W 52/02* | (2009.01) |
| *H04W 76/28* | (2018.01) |
| *H04W 72/04* | (2009.01) |

(52) U.S. Cl.
CPC ..... *H04W 52/0225* (2013.01); *H04W 72/042* (2013.01); *H04W 72/0446* (2013.01); *H04W 76/28* (2018.02)

(58) Field of Classification Search
CPC .......... H04W 52/0225; H04W 72/042; H04W 72/0446; H04W 76/28
See application file for complete search history.

(56) References Cited

U.S. PATENT DOCUMENTS

| | | | |
|---|---|---|---|
| 2017/0187474 A1* | 6/2017 | Bin Sediq | ............. H04L 1/1864 |
| 2018/0049271 A1* | 2/2018 | Bagheri | ............. H04L 27/2601 |
| 2019/0208538 A1* | 7/2019 | Lee | ........................ H04W 76/28 |

(Continued)

FOREIGN PATENT DOCUMENTS

| | | |
|---|---|---|
| CN | 102932881 A | 2/2013 |
| WO | 2016197366 A1 | 12/2016 |

OTHER PUBLICATIONS

Huawei et al., "DRX configuration in NR", R2-1706474 update to R2-1705206, 3GPP TSG-RAN WG2 NR Adhoc, Qingdao, China, Jun. 27-30, 2017.

(Continued)

*Primary Examiner* — Walter J Divito
(74) *Attorney, Agent, or Firm* — ScienBiziP, P.C.

(57) ABSTRACT

A method, by a user equipment (UE), for discontinuous reception (DRX) operation is described. The method includes receiving, by receiving circuitry of the UE, a radio resource control (RRC) configuration containing a first DRX parameter configuration, the first DRX parameter configuration configuring a first DRX parameter having a first unit, and receiving, by the receiving circuitry of the UE, the RRC configuration containing a second DRX parameter configuration, the second DRX parameter configuration configuring a second DRX parameter having a second unit, where the first unit is in millisecond or sub-millisecond, and the second unit is in slot or symbol.

12 Claims, 9 Drawing Sheets

(56) References Cited

U.S. PATENT DOCUMENTS

2019/0335528 A1* 10/2019 Bin Sediq ............. H04W 76/28
2020/0245395 A1* 7/2020 Zhang ................... H04L 5/0053

OTHER PUBLICATIONS

Intel Corporation, "Bandwidth parts configuration and operations", R1-1707420, 3GPP TSG RAN WG1 Meeting #89, Hangzhou, China, May 15-19, 2017.
Intel Corporation, "C-DRX enhancement in NR", R2-1707026 Revision of R2-1704785, 3GPP TSG RAN WG2 Meeting NR Ad hoc, Qingdao, China, Jun. 27-29, 2017.
Huawei et al., "Discussion on wake up signal", R1-1703333, 3GPP TSG RAN WG1 Meeting #88, Athens, Greece, Feb. 13-17, 2017.

* cited by examiner

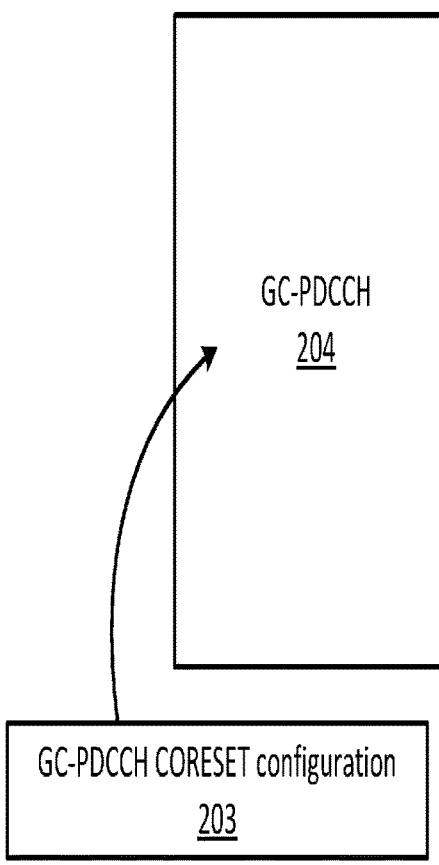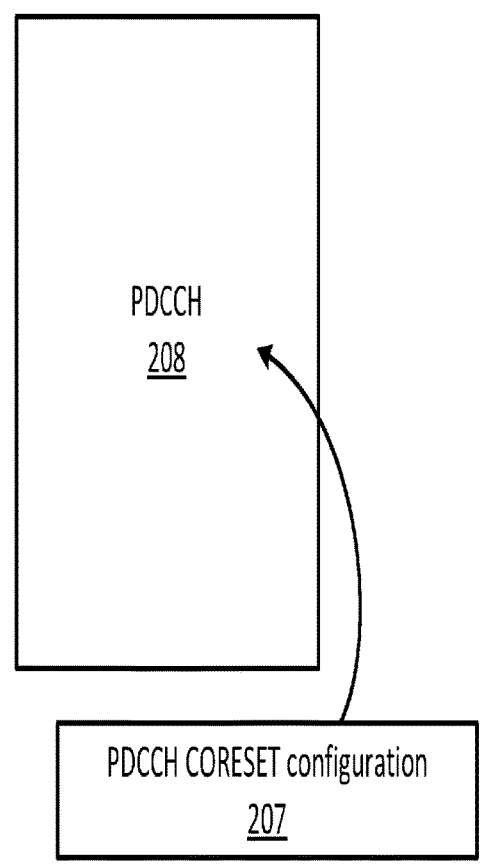

DEVICES AND METHODS FOR DISCONTINUOUS RECEPTION IN NEW RADIO

CROSS-REFERENCE TO RELATED APPLICATION(S)

The present application is a continuation of non-provisional U.S. patent application Ser. No. 16/100,659 filed on Aug. 10, 2018, which claims the benefit of and priority to a provisional U.S. Patent Application Ser. No. 62/544,181 filed Aug. 11, 2017, entitled "DRX OPERATION AND CONFIGURATION IN NEW RADIO," (hereinafter referred to as "US71709 application"). The disclosure and contents of all of the above-named applications are hereby incorporated fully by reference into the present application.

FIELD

The present disclosure generally relates to wireless communication, and more particularly, to devices and methods for discontinuous reception operations.

BACKGROUND

In a wireless communication network, such as a (evolved) long term evolution ((e)LTE) network, discontinuous reception (DRX) is commonly used between a base station and one or more user equipments (UEs) to preserve the battery life of the UEs. For example, during DRX, a UE may switch off its RF module and/or suspend control channel monitoring between data transmissions. The UE may periodically monitor the control channel (e.g., a physical downlink control channel (PDCCH)) with preconfigured ON/OFF cycles based on, for example, the base station's configuration and real traffic pattern. The base station may configure and transmit DRX configuration parameters and timers, such as DRX On Duration Timer (drx-onDurationTimer), DRX Inactivity Timer (drx-InactivityTimer), DRX Retransmission Timer (drx-RetransmissionTimer), DRX Long Cycle Start Offset (drx-LongCycleStartOffset), DRX Short Cycle (drx-ShortCycle), DRX Short Cycle Timer (drx-ShortCycleTimer), and Round-Trip Time Timer (RTT Timer), to the UE.

In order to increase the flexibility on data scheduling in the next generation (e.g., fifth generation (5G) new radio (NR)) wireless communication networks, the Third Generation Partnership Project (3GPP) has introduced new designs on forming frame structures and allocating control channels, where not all elements in a frame structure will have a fixed time unit.

Thus, there is a need in the art for devices and methods for flexible DRX operations for the next generation wireless communication networks.

SUMMARY

The present disclosure is directed to devices and methods for discontinuous reception in new radio.

In a first aspect of the present disclosure, a method, by a user equipment (UE), for discontinuous reception (DRX) operation is described, the method comprising: receiving, by receiving circuitry of the UE, a radio resource control (RRC) configuration containing a first DRX parameter configuration, the first DRX parameter configuration configuring a first DRX parameter having a first unit; receiving, by the receiving circuitry of the UE, the RRC configuration containing a second DRX parameter configuration, the second DRX parameter configuration configuring a second DRX parameter having a second unit; wherein the first unit is in millisecond, and the second unit is in slot or symbol.

According to one implementation of the first aspect, a first duration of the first unit is fixed, a second duration of the second unit is scalable, and a determination of the second duration of the second unit is based on a frame structure of a bandwidth part (BWP) in which the second DRX parameter is applied.

According to another implementation of the first aspect, the frame structure is determined based on subcarrier spacing.

According to another implementation of the first aspect, the second duration of the second unit is scaled for each data transmission scheduling based on a BWP indicator and a pre-configured subcarrier spacing indicator for each configured BWP.

According to another implementation of the first aspect, the first unit is in sub-millisecond.

According to another implementation of the first aspect, at least one of the first and second DRX parameters includes an drx-onDurationTimer, a drx-ShortCycle, a drx-LongCycleStartOffset, a drx-InactivityTimer, a drx-HARQ-RTT-TimerDL, a drx-HARQ-RTT-TimerUL, a drx-RetransmissionTimerDL, or a drx-RetransmissionTimerUL.

According to another implementation of the first aspect, when the second DRX parameter is not received by the UE during an ON cycle of the DRX operation, the UE applies a previously received second DRX parameter received during a previous ON cycle of the DRX operation.

According to another implementation of the first aspect, the second DRX parameter is received by the UE over a physical downlink control channel (PDCCH) or a group common (GC)-PDCCH; the second duration of the second unit is further based on slot/symbol format information (SFI) or radio resource format indication in the PDCCH or the GC-PDCCH.

According to another implementation of the first aspect, the first DRX parameter is configured based on an ON/OFF cycle of the DRX operation; the second DRX parameter is reconfigurable, and is received by the UE during one or more ON cycles of the DRX operation.

According to another implementation of the UE monitors one or more subcarriers, sub-bands, or BWPs for receiving the second DRX parameter.

In a second aspect of the present disclosure, a user equipment (UE), for discontinuous reception (DRX) operation is described, the UE comprising: receiving circuitry configured to: receive a radio resource control (RRC) configuration containing a first DRX parameter configuration, the first DRX parameter configuration configuring a first DRX parameter having a first unit; receive the RRC configuration containing a second DRX parameter configuration, the second DRX parameter configuration configuring a second DRX parameter having a second unit; wherein the first unit is in millisecond or sub-millisecond, and the second unit is in slot or symbol.

According to one implementation of the second aspect, a first duration of the first unit is fixed, a second duration of the second unit is scalable, and a determination of the second duration of the second unit is based on a frame structure of a bandwidth part (BWP) in which the second DRX parameter is applied.

According to another implementation of the second aspect, the frame structure is determined based on subcarrier spacing.

According to another implementation of the second aspect, the second duration of the second unit is scaled for each data transmission scheduling based on a BWP indicator and a pre-configured subcarrier spacing indicator for each configured BWP.

According to another implementation of the second aspect, at least one of the first and second DRX parameters includes an drx-onDurationTimer, a drx-ShortCycle, a drx-LongCycleStartOffset, a drx-InactivityTimer, a drx-HARQ-RTT-TimerDL, a drx-HARQ-RTT-TimerUL, a drx-RetransmissionTimerDL, or a drx-RetransmissionTimerUL.

According to another implementation of the second aspect, when the second DRX parameter is not received by the UE during an ON cycle of the DRX operation, the UE applies a previously received second DRX parameter received during a previous ON cycle of the DRX operation.

According to another implementation of the second aspect, the second DRX parameter is received by the UE over a physical downlink control channel (PDCCH) or a group common (GC)-PDCCH; the second duration of the second unit is further based on slot/symbol format information (SFI) or radio resource format indication in the PDCCH or the GC-PDCCH.

According to another implementation of the second aspect, the first DRX parameter is configured based on an ON/OFF cycle of the DRX operation; the second DRX parameter is reconfigurable, and is received by the UE during one or more ON cycles of the DRX operation.

According to another implementation of the UE monitors one or more subcarriers, sub-bands, or BWPs for receiving the second DRX parameter.

In a third aspect of the present disclosure, a method, by a base station, for discontinuous reception (DRX) operation is described, the method comprising: providing, by transmitting circuitry of the base station, a radio resource control (RRC) configuration containing a first DRX parameter configuration, the first DRX parameter configuration configuring a first DRX parameter having a first unit; providing, by the transmitting circuitry of the base station, the RRC configuration containing a second DRX parameter configuration, the second DRX parameter configuration configuring a second DRX parameter having a second unit; wherein the first unit is in millisecond, and the second unit is in slot or symbol.

According to one implementation of the third aspect, a first duration of the first unit is fixed, a second duration of the second unit is scalable, and a determination of the second duration of the second unit is based on a frame structure of a bandwidth part (BWP) in which the second DRX parameter is applied.

According to another implementation of the third aspect, the frame structure is determined based on subcarrier spacing.

According to another implementation of the third aspect, the second duration of the second unit is scaled for each data transmission scheduling based on a BWP indicator and a pre-configured subcarrier spacing indicator for each configured BWP.

According to another implementation of the third aspect, the first unit is in sub-millisecond.

According to another implementation of the third aspect, at least one of the first and second DRX parameters includes an drx-onDurationTimer, a drx-ShortCycle, a drx-LongCycleStartOffset, a drx-InactivityTimer, a drx-HARQ-RTT-TimerDL, a drx-HARQ-RTT-TimerUL, a drx-RetransmissionTimerDL, or a drx-RetransmissionTimerUL.

According to another implementation of the third aspect, the second DRX parameter is provided by the base station over a physical downlink control channel (PDCCH) or a group common (GC)-PDCCH; the second duration of the second unit is further based on slot/symbol format information (SFI) or radio resource format indication in the PDCCH or the GC-PDCCH.

According to another implementation of the third aspect, the first DRX parameter is configured based on an ON/OFF cycle of the DRX operation; the second DRX parameter is reconfigurable, and is provided by the base station during one or more ON cycles of the DRX operation.

According to another implementation of the third aspect, the base station provides the second DRX parameter in one or more subcarriers, sub-bands, or BWPs.

According to another implementation of the third aspect, the second DRX parameter is reconfigurable by the base station either periodically or for each data transmission scheduling.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 2A is a diagram illustrating a control resource set (CORESET) configuration for a group common physical downlink control channel (GC-PDCCH) resource, according to an example implementation of the present application.

FIG. 2B is a diagram illustrating a CORESET configuration for a PDCCH resource, according to an example implementation of the present application.

DETAILED DESCRIPTION

Figure 1:
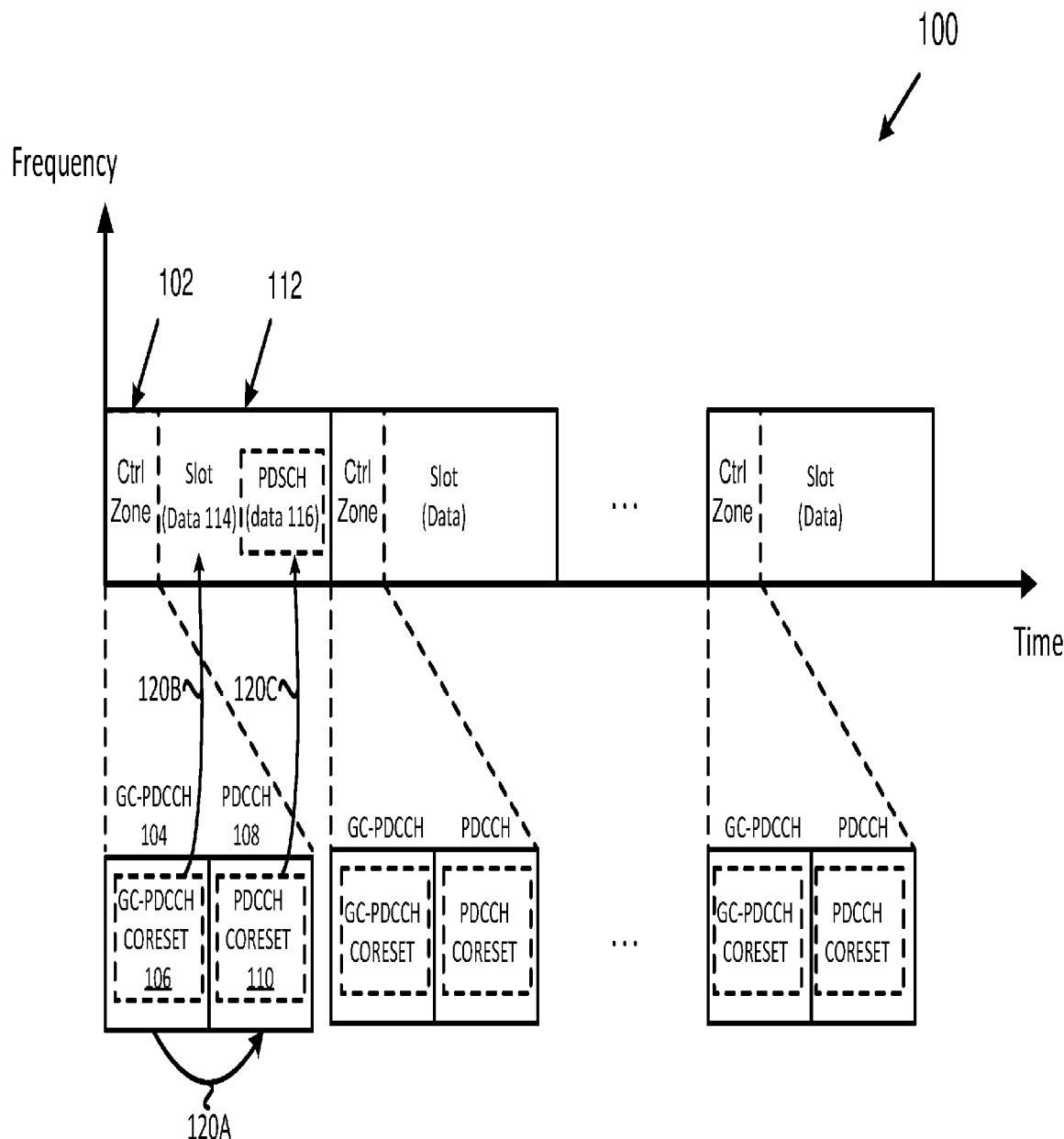
FIG. 1 is a schematic diagram illustrating a control channel architecture, according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for the next generation (e.g., 5G NR) wireless communication networks is to support flexible configurations for accommodating various next generation communication requirements, such as eMBB, mMTC, and URLLC, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

Under the 3GPP discussion, the physical layer of a next generation (e.g., 5G NR) wireless communication network will not only contain physical downlink control channels (PDCCHs) for all of the UEs within a cell, but also group common PDCCHs (GC-PDCCHs) for some of the UEs within the cell.

FIG. 1 is a schematic diagram illustrating a control channel architecture, according to an example implementation of the present application. In diagram 100, control zone 102 includes at least one PDCCH (e.g., PDCCH 108). In the present implementation, at least one GC-PDCCH (e.g., GC-PDCCH 104) may also be located in control zone 102. In another implementation, the GC-DCCH(s) may be located in other control regions.

In one implementation, GC-PDCCH 104 may contain information that allows one or more UEs to decode PDCCH 108, as indicated by arrow 120A. In another implementation, GC-PDCCH CORESET 106 may contain information for one or more UEs to receive data 114 directly in data zone 112, as indicated by arrow 120B. In another implementation, PDCCH CORESET 110 may contain information for one or more UEs to receive data (e.g., data 116) over one or more physical downlink share channels (PDSCHs) in data zone 112, as indicated by arrow 120C. In addition, a GC-PDCCH (e.g., GC-PDCCH 104) may further include control information for a group of UEs in a cell. The control information includes slot format related information and slot/symbol format indicator/information (SFI). The SFI may contain the number of downlink (DL) and uplink (UL) symbols per slot, the number of slots per subframe, and/or the slot length. Although FIG. 1 illustrates that GC-PDCCH CORESET 106 and PDCCH CORESET 110 are contained in GC-PDCCH 104 and PDCCH 108, respectively, in another implementation, GC-PDCCH CORESET 106 and PDCCH CORESET 110 may contain resource (e.g., time and frequency) allocation information that allows a UE to locate GC-PDCCH 104 and PDCCH 108, respectively. In such a case, the GC-PDCCH CORESET 106 and PDCCH CORESET 110 may not be contained in GC-PDCCH 104 and PDCCH 108, respectively.

As can be seen in FIG. 1, the downlink control channel monitoring operations under a next generation (e.g., 5G NR) wireless communication network is more flexible than those in the (e)LTE networks. For example, a base station can configure a UE's downlink control channel monitoring behavior through UE-specific CORESET configurations. In various implementations, a CORESET configuration may include, but is not limited to, a specific region (e.g., specific time and/or frequency resources) within a control channel that a UE may obtain information, such as downlink control information (DCI), and/or a specific region (e.g., time and frequency resources) in the GC-PDCCH or the PDCCH that the UE needs to monitor to avoid blind decoding overhead.

FIGS. 2A and 2B illustrate a GC-PDCCH CORESET configuration and a PDCCH CORESET configuration, respectively, according to example implementations of the present application. As shown in FIG. 2A, a UE may be provided with GC-PDCCH CORESET configuration 203 indicating resource allocation for GC-PDCCH 204 in diagram 200A. In FIG. 2B, a UE may be provided with PDCCH CORESET configuration 207 indicating resource allocation for PDCCH 208. It is note that both of GC-PDCCH CORESET configuration 203 and PDCCH CORESET configuration 207 can be configured through RRC signaling. In another implementation, GC-PDCCH CORESET configuration 203 may be configured through RRC signaling, while PDCCH CORESET configuration 207 may be contained in a GC-PDCCH CORESET (e.g., GC-PDCCH CORESET 106 in FIG. 1).

Figure 3:
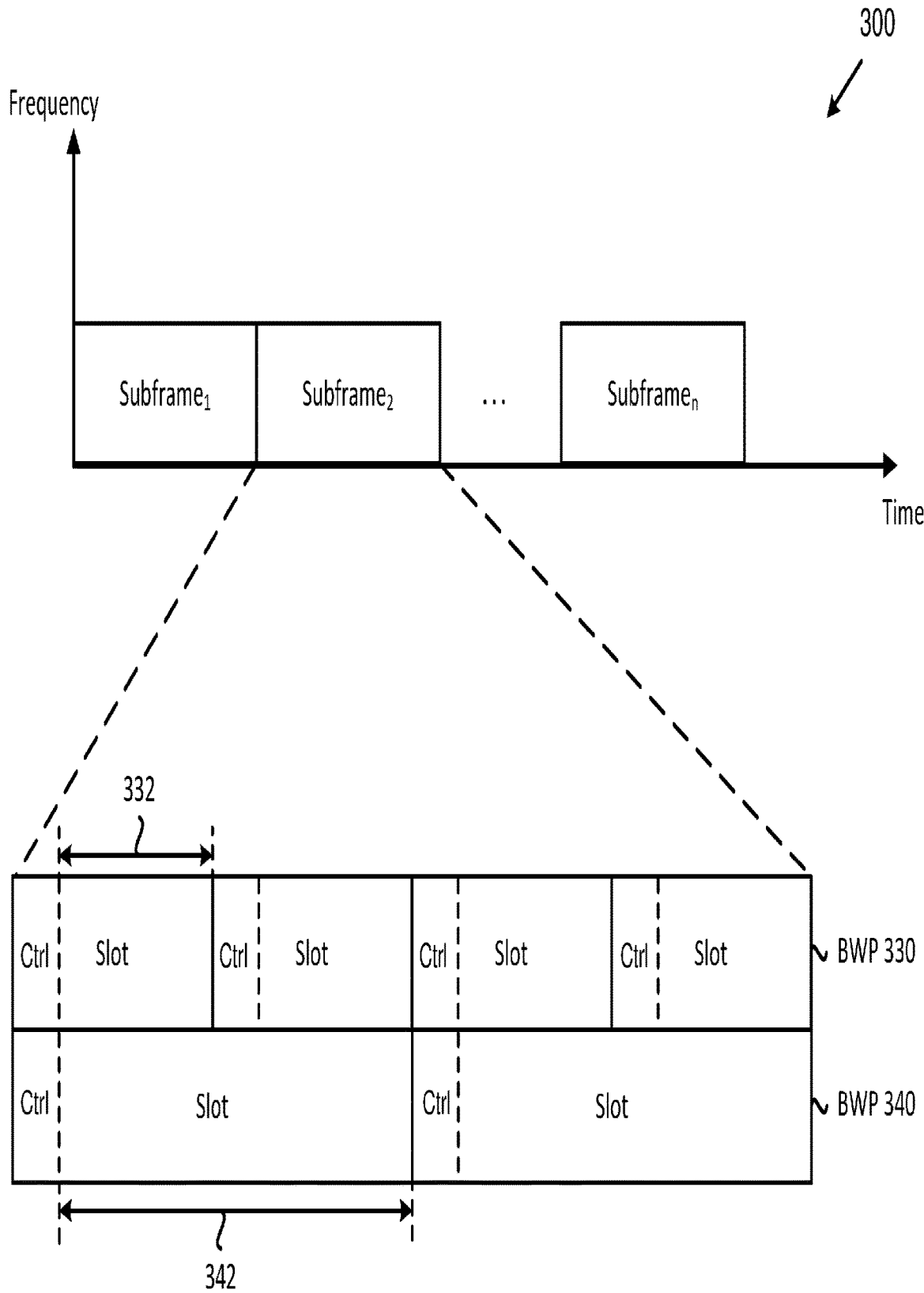
FIG. 3 is a schematic diagram illustrating a frame structure having elements with fixed timing units and elements with scalable timing units, according to an example implementation of the present application.

FIG. 3 is a schematic diagram illustrating a frame structure having elements with fixed timing units and elements with scalable timing units, according to an example implementation of the present application. As illustrated in diagram 300, in a next generation (e.g., 5G NR) wireless communication network, different subcarriers/bandwidth parts (BWPs)/sub-bands may be configured by a base station (e.g., a gNB) with different slot lengths. A UE may be configured to monitor multiple subcarriers/BWPs/sub-bands simultaneously, where each of the subcarriers/BWPs/sub-bands may have a different slot length within a subframe. As can be seen in diagram 300, slot length 332 in BWP 330 is different than slot length 342 in BWP 340, as the sub-carrier spacing of BWP 330 may be different than the sub-carrier spacing of BWP 340. In another implementation, the UE may be configured to monitor a single subcarrier/BWP/sub-band by the base station. In FIG. 3, subframe$_1$ through subframe$_n$ may each have a fixed time length (duration) having a fixed time unit, for example, in millisecond (ms) or sub-millisecond, while the slot length (duration) in BWP 330 and BWP 340 may be different as each slot length has a scalable time unit, for example, in slot or symbol.

In addition, a next generation (e.g., 5G NR) wireless communication network may support cross slot scheduling, where a base station may schedule a UE to perform PDSCH reception in a slot different from the slot that transmitted the PDCCH scheduling information corresponding to the PDSCH reception.

As mentioned above, in a next generation (e.g., 5G NR) wireless communication network, there may be two types of time units, fixed time units (FTUs) and scalable time units (STUs). In various implementations of the present application, subframes, frames and hyper-frames may have FTUs, while slots and symbols may have STUs. For example, a subframe may have a fixed time length (duration) of 1 ms, a frame may have a fixed time length (duration) of 10 ms, and a hyper-frame may have a fixed time length (duration) of 1024 frames, which is 10240 ms. Different from an (e)LTE network, the slot length (duration) in a 5G NR network may not be a static value due to the difference in symbol length among subcarriers/BWPs/sub-bands. The number of symbols included within a slot may be configurable or scalable. For example, for the case of a slot containing a fixed number of symbols, the slot on a carrier with a lower subcarrier spacing may result in a longer symbol length, and hence a longer slot length. On the contrary, a slot on a carrier with a higher subcarrier spacing may result in a shorter symbol length, and hence a shorter slot length.

In FIG. 3, if slot length 332 in BWP 330 is 3 symbols, since symbol is a STU, to determine an actual time duration of the slot in BWP 330, the UE may multiply the scalable length of a symbol in BWP 330 by 3. Similarly, if slot length 342 in BWP 340 is 3 symbols, since symbol is a STU, to determine an actual time duration of the slot in BWP 340, the UE may multiply the scalable length of a symbol in BWP 340 by 3. In one implementation, the scalable length of a symbol in BWP 340 may be longer than the scalable length of a symbol in BWP 330, thereby resulting in the actual time duration of slot length 342 in BWP 340 being longer than the actual time duration of the slot length 332 in BWP 330, as illustrated in FIG. 3.

Figure 4:
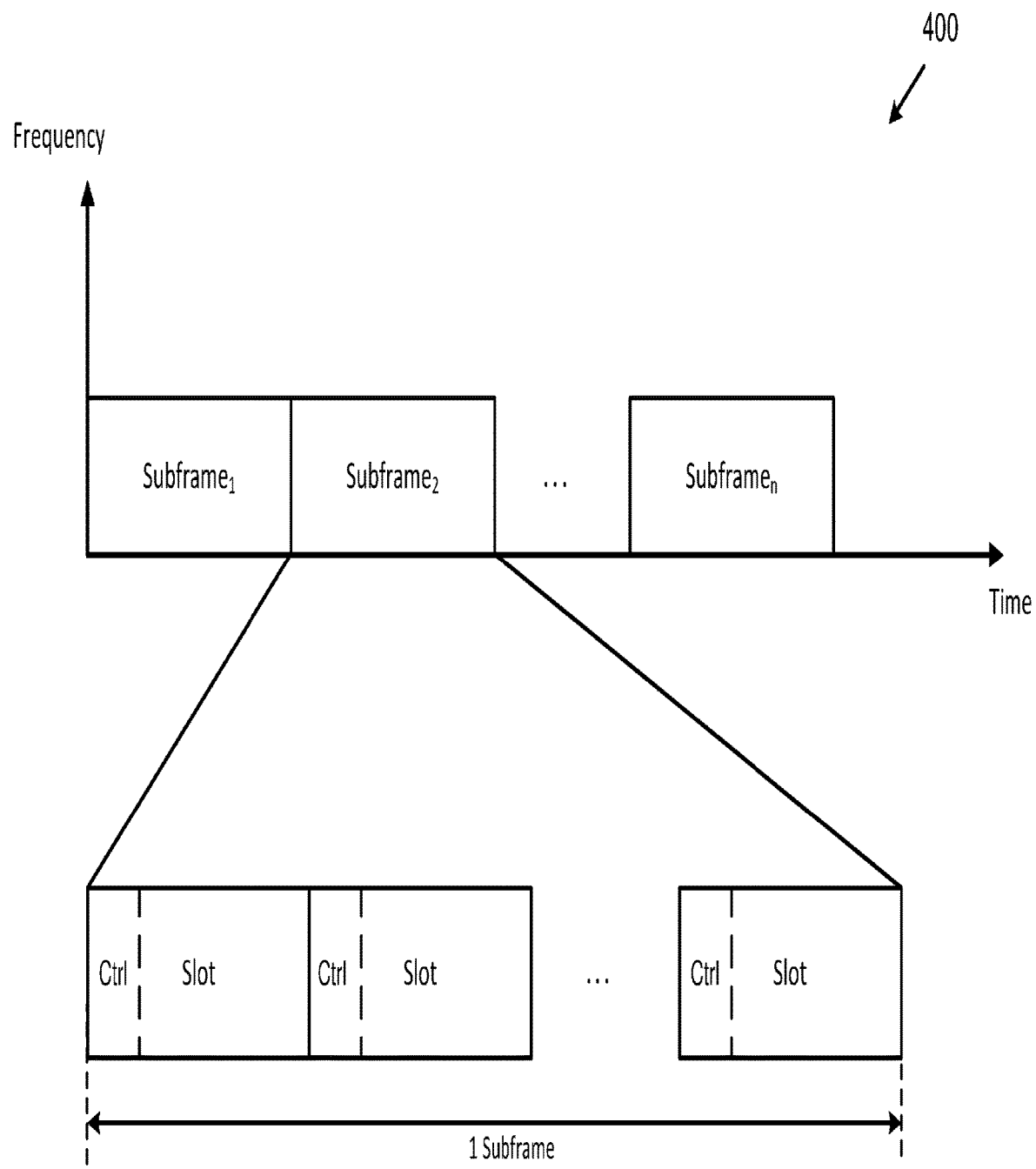
FIG. 4 is a schematic diagram illustrating a frame structure, according to an example implementation of the present application.

Referring to FIG. 4, FIG. 4 is a schematic diagram illustrating a frame structure, according to an example implementation of the present application. In diagram 400, depending on the symbol length and the number of symbols per slot, the number of slots contained in each subframe is also a variable. Hence, the GC-PDCCH and/or PDCCH monitoring within the DRX operation has a significant impact on the flexibility on the next generation (e.g., 5G NR) wireless communication networks for at least reasons described herein.

In various implementations of the present application, the DRX operation can be applied when GC-PDCCH and CORESET are supported. In the following sections, the following cases of the DRX operation in the next generation (e.g., 5G NR) wireless communication networks will be discussed: DRX configuration, DRX operation, RTT timer configuration, Retransmission timer configuration and Cross-slot scheduling.

Case 1: DRX Configuration

In various implementations of Case 1, a base station (e.g., a gNB) may provide to a UE a DRX configuration (DRX-Config) via RRC signaling (e.g., through an RRCReconfiguration message). The DRX-Config may contain one or more DRX parameters including, but not limited to, drx-onDurationTimer, drx-InactivityTimer, drx-RetransmissionTimer (e.g., including drx-RetransmissionTimerDL and drx-RetransmissionTimerUL), drx-LongCycleStartOffset, drx-ShortCycle, drx-ShortCycleTimer, and RTT Timer (e.g., drx-HARQ-RTT-TimerDL and drx-HARQ-RTT-TimerUL). The definition of the above-mentioned DRX parameters are substantially similar to those defined in the (e)LTE networks. The differences may include that each of these parameters may be optionally configured, and the units of these parameters may be symbols, slots, PDCCH monitor periods, or specific length units, which are configured by the base station. In some implementations, the base station may configure one or more DRX parameters (e.g., drx-onDurationTimer, drx-HARQ-RTT-TimerDL, drx-HARQ-RTT-TimerUL, etc.) in a fraction of a symbol, a slot, a PDCCH monitor period, or a millisecond (e.g., ½ ms, ¼ ms, ⅛ ms, 1/16 ms, 1/32 ms, etc.).

In a next generation (e.g., 5G NR) wireless communication network, not all DRX parameters are suitable to be configured with FTUs, since the timing units and scaling thereof can be dynamically configured. In various implementations of the present application, a two-stage DRX mechanism is described to provide a more precise and flexible DRX configuration for the next generation (e.g., 5G NR) wireless communication networks' dynamic frame structures.

In the two-stage DRX mechanism, a base station categorizes DRX parameters into parameters with FTU(s) and parameters with STU(s), and configures these two categories of DRX parameters with FTUs (e.g., subframes, frames or hyper frames) and STUs (e.g., slots or symbols), respectively. It is noted that, the base station may also configure UE-specific scalable time unit(s) (e.g., $STU_{UE}$), which may be in slots or symbols. In addition, the DRX parameters can also be classified based on their usages. For example, one usage may be related to DRX ON/OFF cycle (e.g., drx-onDurationTimer, drx-ShortCycle, drx-ShortCycleTimer and/or drx-LongCycleStartOffset, etc.). Another usage may be related to data (re)transmission (e.g., drx-InactivityTimer, drx-HARQ-RTT-TimerDL, drx-HARQ-RTT-TimerUL, drx-drx-RetransmissionTimerDL, and drx-RetransmissionTimerUL, etc.). Abbreviations of the classifications are summarized in Table 1.

TABLE 1

Abbreviations of parameter classifications

| Abbreviations | Definitions |
| --- | --- |
| STU | Scalable Time Unit; For example, slot and symbol are the STU. |
| FTU | Fix Time Unit; For example, subframe, frame and hyper-frame. |
| $STU_{UE}$ | UE Specific Scalable Tim Unit; A number of slots or symbols which configured by gNB. |
| PWF | Parameter with FTU; PWF includes $PWF_C$ and $PWF_T$. |
| $PWF_C$ | ON/OFF cycle related parameter (i.e., drx-onDurationTimer, drx-ShortCycle and/or drx-LongCycleStartOffset) with FTU. |
| $PWF_T$ | Data (re)transmission related parameter (i.e., drx-InactivityTimer, RTT Timer (e.g., drx-HARQ-RTT-TimerDL and drx-HARQ-RTT-TimerUL) and drx-RetransmissionTimer (e.g., drx-RetransmissionTimerDL and drx-RetransmissionTimerUL)) with FTU. |
| PWS | Parameter With STU or $STU_{UE}$; PWS includes $PWS_C$ and $PWS_T$. |
| $PWS_C$ | ON/OFF cycle related parameter (i.e., drx-onDurationTimer, drx-ShortCycle and/or drx-LongCycleStartOffset) with STU or $STU_{UE}$. |
| $PWS_T$ | Data (re)transmission related parameter (i.e., drx-InactivityTimer, RTT Timer (e.g., drx-HARQ-RTT-TimerDL and drx-HARQ-RTT-TimerUL) and drx-Retransmission Timer (e.g., drx-RetransmissionTimerDL and drx-RetransmissionTimerUL)) with STU or $STU_{UE}$. |

It is noted that, since the unit of drx-ShortCycleTimer is how many short DRX cycles that no data arrival occurs, the parameter, drx-ShortCycleTimer, may be irregular/aperiodic to the timing unit. For example, when the value of drx- ShortCycleTimer=3, the unit is the number of short DRX cycles (e.g., 3 cycles). Thus, the parameter, drx-ShortCycleTimer, may be configured independently from the FTUs and STUs.

In Case 1.1, the base station configures $PWF_C$, and provides the $PWF_C$ to the UE through RRC signaling. The UE wakes up at every ON cycle based on the $PWF_C$, then monitors the control zone (e.g., GC-PDCCH or PDCCH) within each slot(s) or preconfigured slot(s) for receiving $PWS_T$ from the base station. For instance, the UE-specific DCI content (e.g., scrambled by the UE's C-RNTI) may indicate the $PWS_T$ configuration when it appears. It is noted that the UE-specific DCI may occur during any ON cycle, and the $PWS_T$ configuration is applied by the UE when the UE-specific DCI is received. For example, an ON cycle starts at $N^{th}$ subframe, then the UE-specific DCI with indicating $PWS_T$ configuration occurs at $N^{th}$ subframe plus n symbols/slots of the corresponding numerology. Then, the UE applies the drx-InactivityTimer (e.g., starting the timer) at $N^{th}$ subframe plus n symbols/slots. The base station may change $PWS_T$ configurations within an ON cycle, where a later configuration can overwrite the previous configuration when one appears.

In Case 1.2, similar to Case 1.1, the base station configures $PWF_C$ prior to the DRX operation, and provides the $PWF_C$ to the UE through RRC signaling. The UE wakes up at every ON cycle based on the $PWF_C$, then monitors the control zone (e.g., GC-PDCCH or PDCCH) within each slot(s) or preconfigured slot(s) for receiving $PWS_T$ from the base station. Different from Case 1.1, the base station in Case 1.2 optionally configures another specific set of ON/OFF cycle related parameters having $PWS_C$ with STU(s) within the current ON cycle, where the $PWS_C$ is used within the current ON cycle of the $PWF_C$.

In Case 1.3, the base station configures $PWF_C$, and provides the $PWF_C$ to the UE through RRC signaling. The base station also configures multiple sets of $PWS_T$ to the UE, and provides the multiple sets of $PWS_T$ to the UE through RRC signaling, where each set may be assigned with a specific index value (e.g., $PWS_T$ index). For example, if the base station has three types of frame structures, then the base station provides three sets of $PWS_T$ corresponding to the three types of frame structures to the UE. The UE applies one of the multiple sets of $PWS_T$ based on the current frame structure configured by the base station. In addition, within the multiple sets of $PWS_T$ configured by the base station, one of the $PWS_T$ set can be assigned to be a default $PWS_T$ set.

In Case 1.4, the base station configures multiple sets of $PWS_C$ and $PWS_T$, and provides them to the UE through RRC signaling. Each set of $PWS_C$ or $PWS_T$ corresponds to a specific type of frame structure. The UE applies one of the multiple sets of $PWS_C$ or $PWS_T$ based on the current frame structure configured by the base station.

In Case 1.5, the base station configures multiple sets of $PWF_C$ and $PWS_T$, and provides them to the UE through RRC signaling. Each set of $PWF_C$ or $PWS_T$ corresponds to a specific type of frame structure.

In Case 1.6, the base station configures $PWS_T$, and provides the $PWS_T$ to the UE through RRC signaling prior to the DRX operation. The base station also configures multiple sets of $PWF_C$ to the UE, and provides the multiple sets of $PWF_C$ to the UE through RRC signaling prior to the DRX operation, where each set may be assigned with a specific index value (e.g., $PWF_C$ index). Each set of $PWF_C$ corresponds to a type of frame structure. The UE applies one of the multiple sets of $PWF_C$ based on the current frame structure configured by the base station.

In Case 1.7, the base station configures both PWF and PWS, and provides them to the UE through RRC signaling. After receiving the DRX parameter configuration having the PWF and PWS, the UE may apply $PWS_T$ by referencing the current frame structure (e.g., by referencing the slot length or symbol length). For example, the base station may configure the drx-InactivityTimer to UE with X slots. When a data transmission occurs, the UE may set the drx-InactivityTimer to a length of X times of current slot length configured by the base station.

It is noted that the UE maintains one configuration per RRC entity regardless of how may sub-bands/numerologies/BWPs/component carriers are applied for its transmission. It means that when there is no UL/DL data transmission occurring, the UE may only perform DRX ON/OFF switching based on the $PWF_C$ that is configured with unit of subframe, frame or hyper frame. However, when there is a data transmission and/or a data decoding error occurs, the UE may trigger the corresponding timer(s) (e.g., drx-InactivityTimer, RTT Timer and/or drx-Retransmission Timer) with the $PWS_C$, and count these timers based on the time units of the length of symbol or slot currently configured/allocated by the base station.

Case 2: DRX Operations

For various implementations of Case 1, two-stage DRX operation details are described below.

Case 2.1: DRX Operations of Case 1.1

In Case 2.1, the two-state DRX operations of Case 1.1 are described below.

In Case 2.1.A, when the base station only configures $PWF_C$, and provides the $PWF_C$ to the UE through RRC signaling prior to the DRX operation, the UE wakes up at every ON cycle based on the $PWF_C$ for receiving $PWS_T$. For example, when an ON cycle configured by $PWF_C$ starts at $N^{th}$ subframe and the UE-specific DCI without indicating $PWS_T$ occurs at $N^{th}$ subframe plus n symbols/slots of corresponding numerology, then the UE does not apply the drx-InactivityTimer at $N^{th}$ subframe plus n symbols/slots even when there is data transmitted from the base station. In addition, the RTT Timer and the drx-Retransmission Timer are not applied even when a data decoding error occurs. In another implementation, when the UE-specific DCI is received without $PWS_T$, the UE may apply the $PWS_T$ received in the previous ON cycle or received in the past for activating the corresponding drx-InactivityTimer, RTT Timer and drx-Retransmission Timer.

In Case 2.1.B, similar to Case 2.1.A, $PWF_C$ is configured to the UE by the base station, the UE wakes up at every ON cycle based on the $PWF_C$ for receiving $PWS_T$. When the UE-specific DCI with $PWS_T$ occurs at $N^{th}$ subframe plus n symbols/slots of the corresponding numerology, the UE applies the drx-InactivityTimer (e.g., starting the timer) at $N^{th}$ subframe plus n symbols/slots. When another UE-specific DCI indicating another set of $PWS_T$ occurs at $N+M^{th}$ subframe plus m symbols/slots of the corresponding numerology, then the UE restarts the drx-InactivityTimer at $N+M^{th}$ subframe plus m symbols/slots of the corresponding numerology only if the expiration of the drx-InactivityTimer which needs to be triggered by the latest $PWS_T$ is longer than the previous one.

In Case 2.1.C, similar to Case 2.1.B, $PWF_C$ is configured to the UE by the base station, the UE wakes up at every ON cycle based on the $PWF_C$ for receiving $PWS_T$. When the UE-specific DCI indicating $PWS_T$ occurs at $N^{th}$ subframe plus n symbols/slots of the corresponding numerology, the UE applies the drx-InactivityTimer (e.g., starting the timer) at $N^{th}$ subframe plus n symbols/slots. When another UE-specific DCI indicating another set of $PWS_T$ occurs at $N+M^{th}$ subframe plus m symbols/slots of the corresponding numerology, then the UE restarts the drx-InactivityTimer at $N+M^{th}$ subframe plus m symbols/slots of the corresponding numerology based on the configuration in the latest $PWS_T$.

In Case 2.1.D, similar to Case 2.1.B and Case 2.1.C, when an updated $PWS_T$ is received by the UE, and a data decoding error occurs while the RTT Timer, which is applied based on the latest $PWS_T$, is running, then the UE restarts the RTT Timer, or restarts the RTT Timer only if the expiration of the RTT Timer which needs to be triggered by the latest $PWS_T$ is longer than the previous one.

In Case 2.1.E, the base station configures a default $PWS_T$ to the UE. When the UE does not receive any additional $PWS_T$, the UE applies the default $PWS_T$.

In Case 2.1.F, for Case 1.1, $PWF_C$ is configured to the UE by the base station, the UE wakes up at every ON cycle based on the $PWF_C$ for receiving $PWS_T$. When the UE-specific DCI indicating $PWS_T$ occurs at $N^{th}$ subframe plus n symbols/slots of the corresponding numerology on a sub-carrier/BP/sub-band, the UE applies the drx-InactivityTimer (e.g., starting the timer) at $N^{th}$ subframe plus n symbols/slots. Then, another UE-specific DCI indicating another set of $PWS_T$ occurs at $N+M^{th}$ subframe plus m symbols/slots of the corresponding numerology on another subcarrier/BWP/sub-band. Then, the UE restarts the drx-InactivityTimer at $N+M^{th}$ subframe plus m symbols/slots of the corresponding numerology based on the configuration in the latest $PWS_T$, or only if the expiration of the drx-InactivityTimer which needs to be triggered by the latest $PWS_T$ is longer than the previous one.

In Case 2.1.G, for Case 1.2, each of the subcarriers/BWPs/sub-bands may apply the same set of $PWS_T$ configurations. For example, when there is a data transmission and/or a data decoding error occurs in one of the subcarriers/BWPs/sub-bands, then the UE counts the corresponding timer(s) (e.g., drx-InactivityTimer, RTT Timer and/or drx-RetransmissionTimer) based on the time unit of the slot length of the subcarriers/BWPs/sub-bands. It is noted that all of the subcarriers/BWPs/sub-bands maintain the same drx-InactivityTimer, RTT Timer and/or drx-Retransmission Timer. Hence, similar to Case 2.1.F, $PWF_C$ is configured to the UE by the base station, the UE wakes up at every ON cycle based on the $PWF_C$ for receiving $PWS_T$. When UE-specific DCI indicating $PWS_T$ occurs at $N^{th}$ subframe plus n symbols/slots of the corresponding numerology on a sub-carrier/BWP/sub-band, then the UE applies drx-Inactivity-Timer (e.g., starting the timer) at $N^{th}$ subframe plus n symbols/slots. Then, another UE-specific DCI occurs at $N+M^{th}$ subframe plus m symbols/slots of the corresponding numerology on another subcarrier/BP/sub-band. Then, the UE restarts drx-InactivityTimer (e.g., restarting the timer) at $N+M^{th}$ subframe plus m symbols/slots of the corresponding numerology based on the configuration in the latest $PWS_T$, or only if the expiration of the drx-InactivityTimer which needs to be triggered by the latest $PWS_T$ is longer than the previous one.

In Case 2.1.H, similar to Case 2.1.F, when another $PWS_T$ is received on a second subcarrier/BWP/sub-band and a data decoding error occurs on the second subcarrier/BWP/sub-band while the RTT Timer, which is applied based on the previous $PWS_T$, is running, then the UE restarts the RTT Timer, or restarts the RTT Timer only if the expiration of the RTT Timer which needs to be triggered by the latest $PWS_T$ is longer than the previous one.

In Case 2.1.I, similar to Case 2.1.G, when a data decoding error occurs on a second subcarrier/BWP/sub-band while the RTT Timer is running, the UE restarts the RTT Timer, or restarts the RTT Timer only if the expiration of the RTT Timer which needs to be triggered by the latest $PWS_T$ is longer than the previous one.

Case 2.2: DRX Operations of Case 1.2

In Case 2.2, the two-state DRX operations of Case 1.2 are described below.

Figure 5:
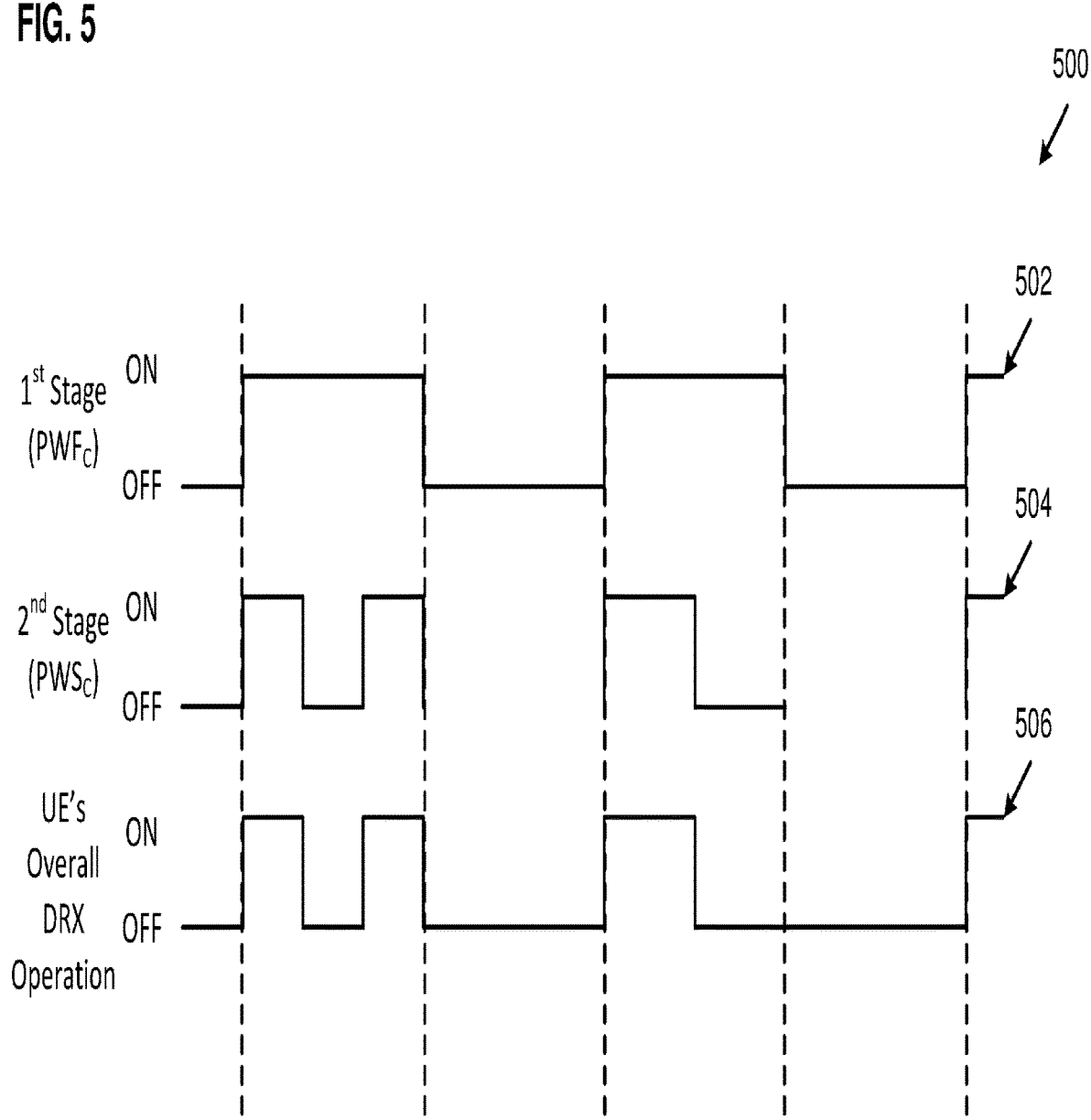
FIG. 5 is a diagram illustrating a two-stage DRX operation channel, according to an example implementation of the present application.

In Case 2.2.A, when the base station only configures $PWF_C$, and provides the $PWF_C$ (e.g., $PWF_C$ cycle 502 in FIG. 5) to the UE through RRC signaling prior to the DRX operation, the UE wakes up at every ON cycle based on the $PWF_C$ for receiving $PWS_T$ and/or $PWS_C$ (e.g., $PWS_T$ and/or $PWS_C$ pattern 504 in FIG. 5). For example, when the UE receives the $PWS_C$ during an ON cycle, the UE follows the $PWS_T$ and/or $PWS_C$ configuration(s) to perform DRX within the ON cycle of the $PWF_C$ (e.g., ignoring the setting in the $PWF_C$). In other words, within the duration of the ON cycle of the $PWF_C$, the exact ON/OFF switching that the UE needs to perform is based on the $PWS_C$ (e.g., a specific set of ON/OFF cycle related parameters configuration) as shown in the UE's overall DRX operation pattern 506 in diagram 500 of FIG. 5.

In Case 2.2.A, the base station configures a rough ON/OFF cycle with fixed time unit, and further assigns detailed ON/OFF cycles with scalable time unit(s) according to the time dependent slot length configuration and dynamically configurable frame structure (e.g., the number of slots per subframe). The specific set of ON/OFF cycle related parameters for the second stage of the DRX may include ON/OFF related timers. It is noted that, if there is a data transmission or the data decoding error occurs within the ON cycle configured by the second stage configuration, then the UE may trigger the drx-InactivityTimer, RTT Timer and/or drx-Retransmission Timer with the configuration of second stage and with time unit of the length of symbol or slot currently.

In Case 2.2.B, the base station may also configure a default $PWS_T$ and/or $PWS_C$ to the UE prior to the DRX operation. When the UE does not receive any additional $PWS_T$, the UE applies the default $PWS_T$ and/or $PWS_C$.

Case 2.3: DRX Operations of Case 1.3

In Case 2.3, the two-state DRX operations of Case 1.3 are described below.

In Case 2.3.A, the base station configures multiple sets of $PWS_T$ to the UE, and provides the multiple sets of $PWS_T$ to the UE through RRC signaling, where each set of $PWS_T$ may be explicitly assigned with a specific index value (e.g., $PWS_T$ index). Afterwards, a UE-specific DCI upon GC-PDCCH or PDCCH indicates an index corresponding to a specific set of $PWS_T$ to be applied within one or more ON cycles configured by $PWF_C$ or within a specific pre-configured period of time. A $PWS_T$ set index can be indicated by the base station within the CORESET of a GC-PDCCH and/or a PDCCH in the first slot or a specific slot (indicated via RRC signaling) of each ON cycle based on the $PWF_C$. In another implementation, the base station may provide the index(ices) of the set(s) of $PWS_T$ via RRC signaling or the UE-specific DCI. In some implementations, if there is no indication from the base station, the UE can operate DRX based on the $PWF_C$ only, which means that no drx-InactivityTimer, RTT Timer and drx-Retransmission Timer will be triggered.

In Case 2.3.B, the base station implicitly indicates which set of $PWS_T$ is to be applied by the UE within each ON cycle configured by $PWF_C$ or within a specific pre-configured period of time. The base station may provide a frame structure to a $PWS_T$ mapping table through RRC signaling or through a broadcast channel (e.g., a channel that notifies the current frame structure related information). Then, the UE applies the proper set of $PWS_T$ according the numerology/TT of the configured sub-band/BWP.

In Case 2.3.C, the base station may also configure a default $PWS_T$ to the UE. When the UE does not receive any additional $PWS_T$, the UE applies the default $PWS_T$.

In Case 2.3.D, if no default $PWS_T$ is configured to the UE prior to the DRX operation, the UE may operate DRX based on the $PWF_C$ only, which means that no drx-InactivityTimer, RTT Timer, and drx-Retransmission Timer is triggered.

Case 2.4: DRX Operations of Case 1.4

In Case 2.4, the two-state DRX operations of Case 1.4 are described below.

In Case 2.4.A, the base station configures multiple sets of $PWS_C$ and $PWS_T$, and provides them to the UE through RRC signaling. The base station explicitly indicates to the UE which set of the $PWS_C$ and $PWS_T$ is be applied through RRC signaling, UE-specific DCI, a GC-PDCCH or a PDCCH.

In Case 2.4.B, the base station configures multiple sets of $PWS_C$ and $PWS_T$, and provides them to the UE through RRC signaling. The base station implicitly indicates which set of the $PWS_C$ and/or $PWS_T$ is be applied by the UE. The base station may provide a frame structure to a $PWS_C$ and $PWS_T$ mapping table via RRC signaling or a broadcast channel (e.g., a channel that notifies the current frame structure related information). Then, the UE applies the proper set of $PWS_C$ and/or $PWS_T$ according to the frame structure of the configured sub-band/BWP.

In Case 2.4.C, the base station configures a default set of $PWS_C$ and $PWS_T$ to the UE. When the UE is configured with multiple BWPs where the frame structures are different from one another as in Case 1.2, the UE applies the default set of $PWS_C$ and $PWS_T$. In another implementation, the UE may apply the set of $PWS_C$ and $PWS_T$ based on the frame structure of the main/primary BWP, the first configured BWP, the BWP that has the longest slot length or the BWP that has the shortest slot length.

Case 2.5: DRX Operations of Case 1.5

In Case 2.5, the two-state DRX operations of Case 1.5 include three cases which follow substantially the same operations as Cases 2.4.A, 2.4.B, and 2.4.C, except "$PWS_C$" and "$PWS_T$" are replaced by "$PWF_C$" and "$PWS_T$", respectively.

Case 2.6: DRX Operations of Case 1.6

In Case 2.6, the two-state DRX operations of Case 1.6 are described below.

In Case 2.6.A, the base station implicitly indicates which set of the $PWF_C$ is to be applied by the UE. The base station provides a frame structure to a $PWF_C$ mapping table via RRC signaling or a broadcast channel (e.g., a channel which notifies current frame structure related information). Then, the UE applies the proper set of $PWF_C$ according to the frame structure of the configured sub-band/BWP.

In Case 2.6.B, the base station may also configure a default $PWF_C$ to the UE prior to the DRX operation. When the UE does not receive any additional $PWS_C$, the UE applies the default $PWF_C$.

Case 3: Control Channel Monitoring

Case 3 includes implementations of GC-PDCCH and/or PDCCH monitoring by a UE during the UE's DRX ON cycles for single-stage or two-stage DRX configurations. In Case 3, a base station (e.g., a gNB) indicates whether, within one or more DRX ON cycles, a UE needs to monitor all GC-PDCCHs and/or PDCCHs, only configured GC-PDCCH CORESET(s) and/or PDCCH CORESET(s) within one or more GC-PDCCHs and/or PDCCHs, or only specific GC-PDCCH and/or PDCCH occasion(s). A GC-PDCCH/PDCCH occasion includes time and frequency resources (e.g., regions) in which a GC-PDCCH/PDCCH occurs. As each subframe contains several slots, there may be several GC-PDCCH and/or PDCCH occasions within each subframe.

There are several implementations for PDCCH occasion monitoring indication.

In Case 3.1, a base station indicates to a UE a PDCCH occasion through RRC signaling or through a GC-PDCCH. The base station may indicate whether the UE needs to monitor: all GC-PDCCH and/or PDCCH occasions; only configured GC-PDCCH CORESET(s) and/or PDCCH CORESET(s) within one or more GC-PDCCHs and/or PDCCHs; or only specific GC-PDCCH and/or PDCCH occasion(s) during a DRX ON cycle, multiple DRX ON cycles, each DRX ON cycle, or a specific period of time.

In Case 3.2, a base station indicates to a UE a PDCCH occasion through a PDCCH(s). The base station may indicate within one or more DRX ON cycles (or for each DRX ON cycle) whether the UE needs to monitor: all PDCCH occasions; only configured PDCCH CORESETs within one or more PDCCHs; or only specific PDCCH occasion(s). By contrast, in legacy LTE wireless networks, a UE is required to monitor a downlink control channel during the entire duration of its ON cycle(s) for DRX operations.

Figure 6:
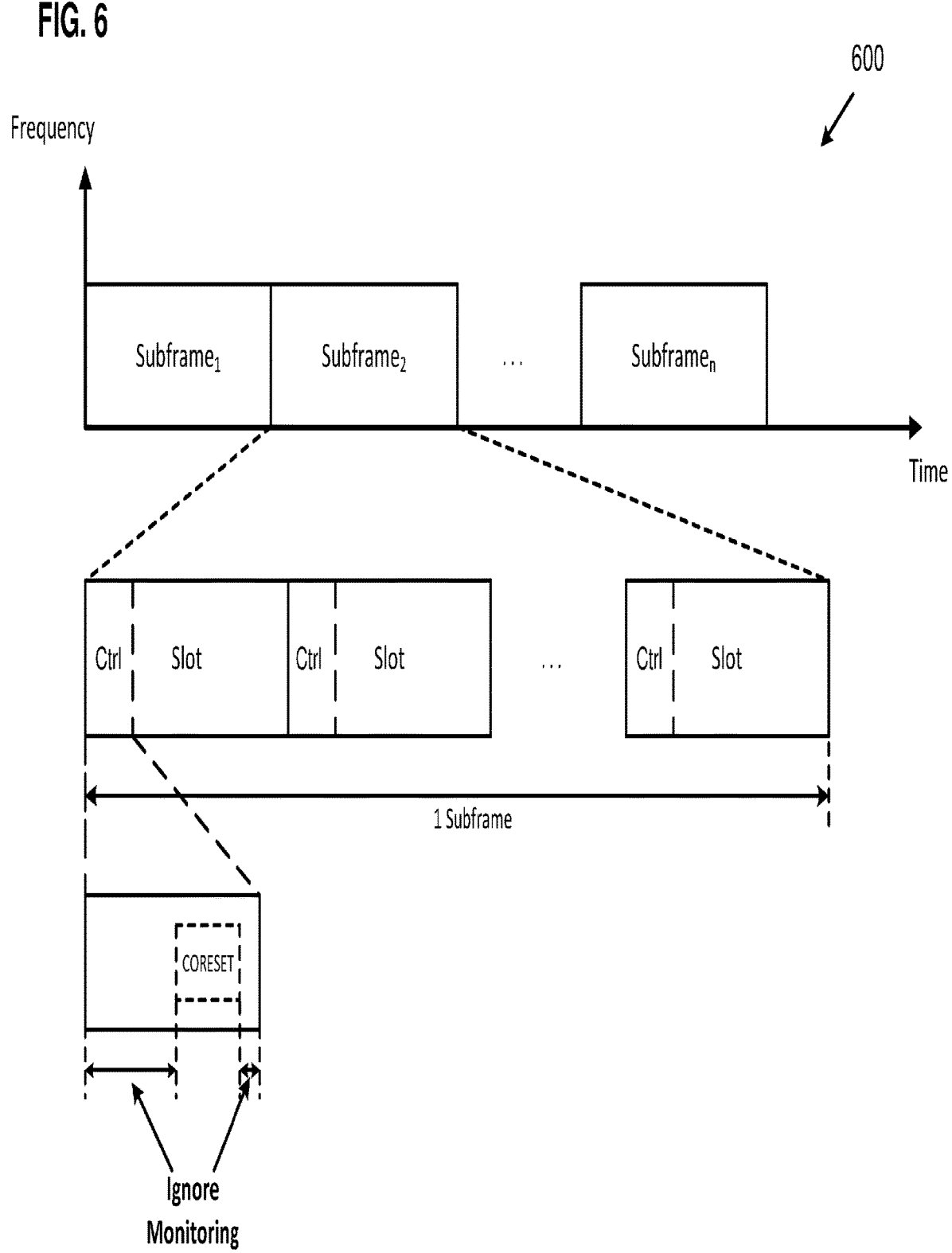
FIG. 6 is a diagram illustrating control channel monitoring, according to an example implementation of the present application.

According to implementations of the present application, a base station may configure to a UE one or more CORESET configurations through RRC signaling. Within each CORESET configuration, the base station may assign specific time and/or frequency resources of a GC-PDCCH and/or a PDCCH to the UE for GC-PDCCH and/or PDCCH monitoring for avoiding blind decoding overhead. In one implementation, the monitoring of the remaining portions of the control channel (GC-PDCCH or PDCCH) may be skipped by the UE, as illustrated in diagram 600 of FIG. 6.

Case 4: RTT Timer Length Configuration

Figure 7:
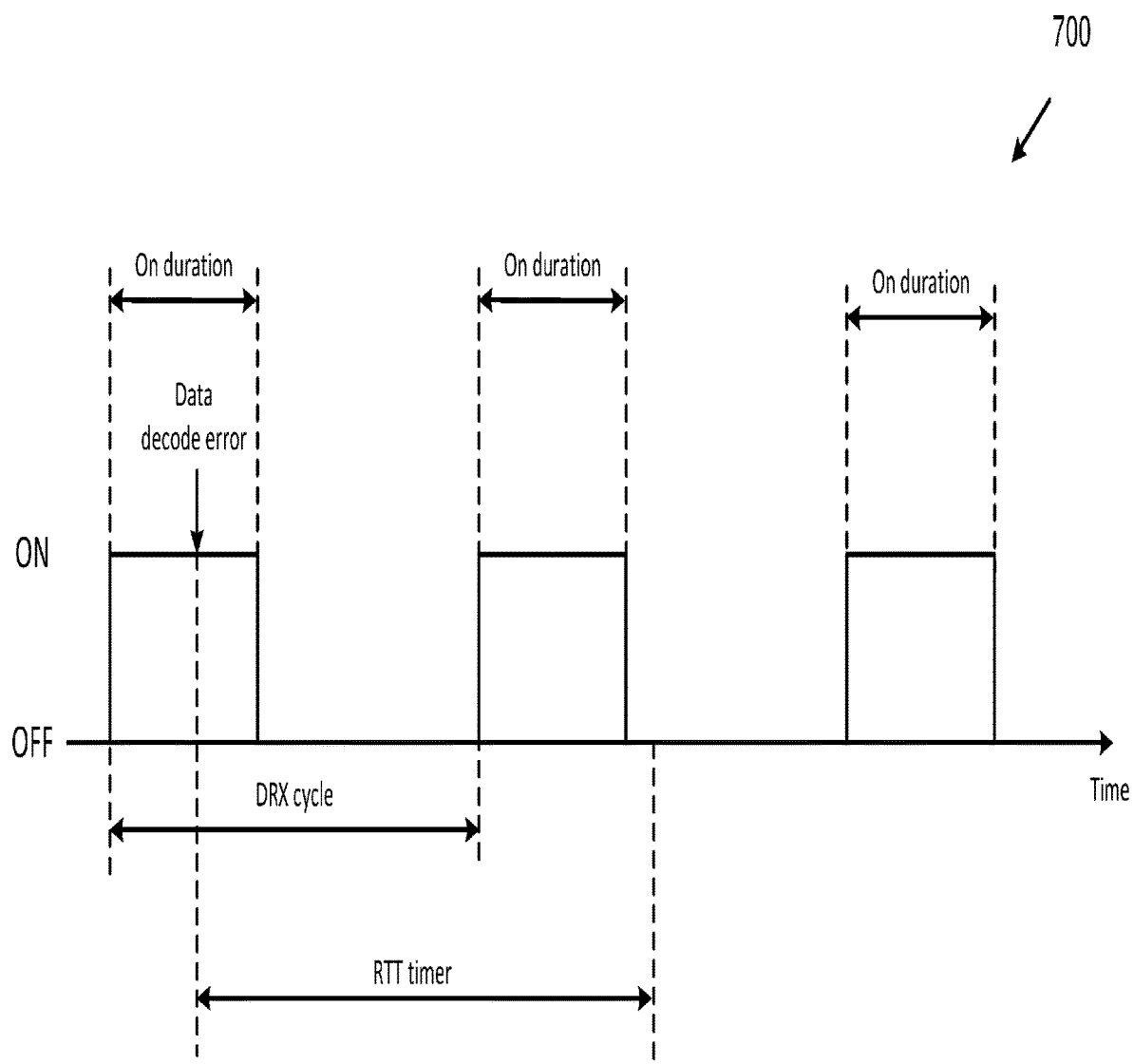
FIG. 7 is a diagram illustrating an RTT Timer and related operations, according to an example implementation of the present application.

FIG. 7 is a diagram illustrating an RTT Timer operation, according to an example implementation of the present application. As shown in FIG. 7, once a UE has a data decoding error occurred during an ON cycle, the UE sets up an RTT Timer. Before the RTT Timer expires, the UE can keep its DRX operation as configured (no need for the UE to stay ON when the ON cycle expires), when there is no other additional data transmission is needed. The RTT Timer length represents the minimal round trip time needed for receiving retransmitted data. In (e)LTE wireless networks, considering the time needed for a UE to perform UL/DL switching and data processing, the RTT Timer has a fixed length (e.g., 8 ms) since the timing scaling for data transmission is with the basis of 1 ms subframe (a Transmission Time Interval (TTI) length). However, in the next generation (e.g., 5G NR) wireless networks, since the TTI length is no longer an integer multiple of 1 ms, and the data transmission between the base station and the UE may be through radio resources with different TTI lengths. It is noted that, according to various implementations of the present application, the TTI may have a time unit of slot or mini-slot. In addition, the UE is expected to have higher level of capability. Hence, for each UE, the length of the RTT Timer can be different, and configured independently. In addition, for a UE, the length of the RTT Timer for each data retransmission can be difference.

The following implementations involve counting and maintenance of the RTT Timer in the next generation (e.g., 5G NR) wireless networks.

In Case 4.1, when a UE attaches to a network, the UE needs to report its capabilities to the network. During the UE's capability reporting, the UE includes its data processing capability indicating how fast the UE can finish decoding of received data packets and generate a corresponding acknowledgement (ACK/NACK). The reporting can be based on pre-defined categories of capabilities. Based on the UE's reporting, the RTT Timer can be configured properly. For more detailed information, the data processing capability may include information based on an exact time length (duration), a number of symbols, a number of slots, a number of sub-frames, or a number of reference TTI length, which are announced by the base station. Alternatively, the UE can simply report its data processing capability level(s) according to a mapping table, which is predefined and/or broadcasted by the base station. The mapping table may categorize different time lengths (or the unit(s) list as above) into several levels. It is noted that, in one implementation, a UE can report substantially zero or zero waiting time is needed for its data processing for URLLC services.

In Case 4.2, in order to have proper configurations for the length of the RTT Timer for each UE and each data transmission, the base station needs to consider the TTI length of the corresponding radio resource used for data transmission. Since the TTI length of each scheduled radio resource used for data transmission can be different, the length of the RTT Timer for each corresponding data transmission need to be configured accordingly. Hence, in some implementations, it is beneficial to let the base station adjust the length of RTT Timer for each data transmission scheduling or periodically.

Based on the physical control channel architecture shown in FIG. 1, slot format related information may be contained in a GC-PDCCH for decoding a PDCCH by the UE, and for performing the corresponding scheduled data transmission. Within the GC-PDCCH or PDCCH, the base station can further configure the length of the RTT Timer for the UE. The length of the RTT Timer can be configured based on the quality of service (QoS) of the scheduled data, the UE's capability (as introduced in previous sub-section), and the TTI length of the radio resource used for the data transmission and for future retransmission. The following are several configuration procedures.

In Case 4.2.A, in one configuration procedure, for each data transmission scheduling, the base station may include an index/sequence within the L1/L2 scheduling information. Based on a predefined mapping table and the received index/sequence, a UE can determine how long the RTT Timer length is. It is note that the length of the RTT Timer indicated by the base station can be an exact value of time or a number of TTIs, slots, symbols or subframes. In the case of TTIs/slots/symbols, the UE may further refer to the SFI or some related radio resource format indication in the GC-PDCCH or PDCCH to figure out the exact length of the RTT Timer.

In Case 4.2.B, in another configuration procedure, similar to Case 4.2.A, the difference is that the index/sequence, the exact value, and/or the number of TTIs/slots/symbols are configured by the base station through RRC signaling to each UE independently. Also, the corresponding mapping tables, SFI, and/or related radio resource format indications are also needed for reference.

In Case 4.2.C, in yet another configuration procedure, the base station may predefine several levels of the length of RTI Timer. In this case, the base station only indicates the levels to the UE through L1/L2 scheduling information or RRC signaling.

It should be noted that the length of the RTT Timer indicated by the base station can be reused for an overall HARQ process (further retransmission of the same data). In another implementation, the base station can reconfigure the length of the RTT Timer for each retransmission.

Figure 8A:
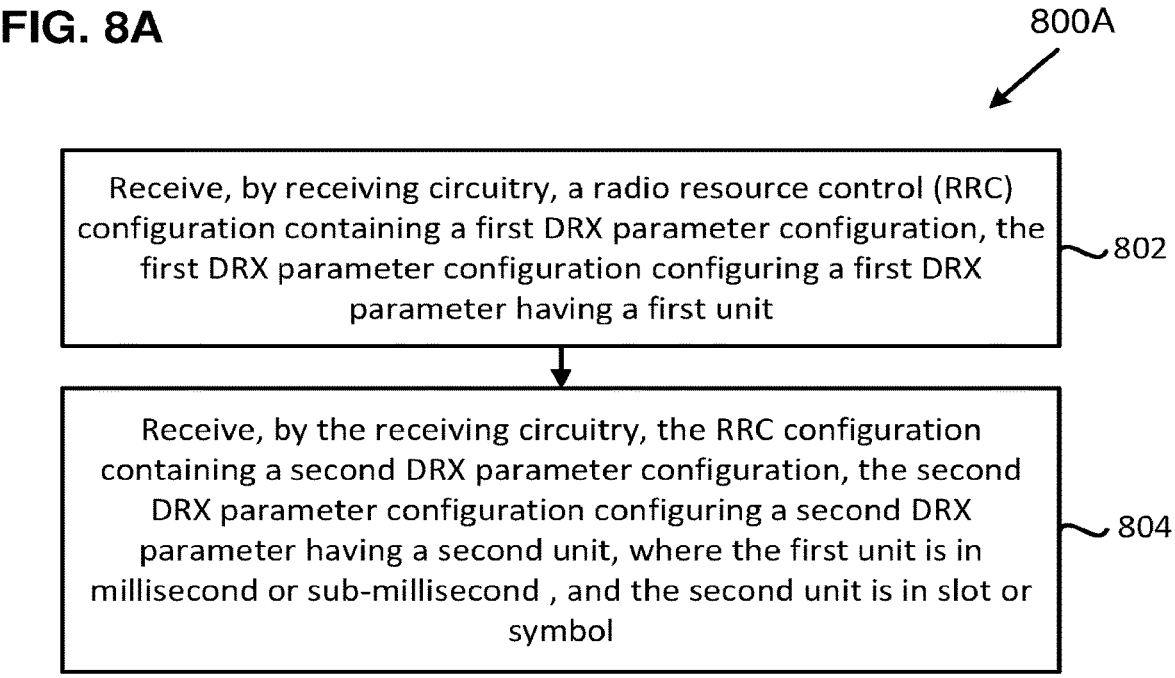
FIG. 8A is a flowchart illustrating a method by a UE for DRX operation, in accordance with an example implementation of the present application.

FIG. 8A is a flowchart 800A illustrating a method by a UE for DRX operation, in accordance with an example implementation of the present application. In the present implementation, the flowchart 800A includes actions 802 and 804. In action 802, the UE, using its receiving circuitry, receives a radio resource control (RRC) configuration containing a first DRX parameter configuration, the first DRX parameter configuration configuring a first DRX parameter having a first unit. In action 804, the UE, using its receiving circuitry, receives the RRC configuration containing a second DRX parameter configuration, the second DRX parameter configuration configuring a second DRX parameter having a second unit, where the first unit is in millisecond or sub-millisecond, and the second unit is in slot or symbol.

In some implementations, a first time length (duration) of the first unit is fixed, and a second time length (duration) of the second unit is scalable. In some implementations, the determination of the second time length of the second unit is based on a frame structure of a bandwidth part (BWP) in which the second DRX parameter is applied. In some implementations, the frame structure is determined based on subcarrier spacing. In some implementations, the first DRX parameter is a parameter with a FTU, such as $PWF_C$ or $PWF_T$ shown in Table 1. In some implementations, the second DRX parameter is a parameter with a STU, such as $PWS_C$ or $PWS_T$ shown in Table 1. In some implementations, the second time length (duration) of the second unit is scaled for each data transmission scheduling based on a BWP indicator and a pre-configured subcarrier spacing indicator for each configured BWP, as described herein. In some implementations, when the second DRX parameter is not received by the UE during an ON cycle of the DRX operation, the UE applies a previously received second DRX parameter received during a previous ON cycle of the DRX operation, as described herein.

In some implementations, the second DRX parameter is received by the UE over a physical downlink control channel (PDCCH) or a group common (GC)-PDCCH. In some implementations, the second time length (duration) of the second unit is further based on slot/symbol format information (SFI) or radio resource format indication in the PDCCH or the GC-PDCCH. In some implementations, the first DRX parameter is configured based on an ON/OFF cycle of the DRX operation as described herein. In some implementations, the second DRX parameter is reconfigurable, and is received by the UE during one or more ON cycles of the DRX operation as described herein. In some implementations, the UE monitors one or more subcarriers, sub-bands, or BWPs for receiving the second DRX parameter.

Figure 8B:
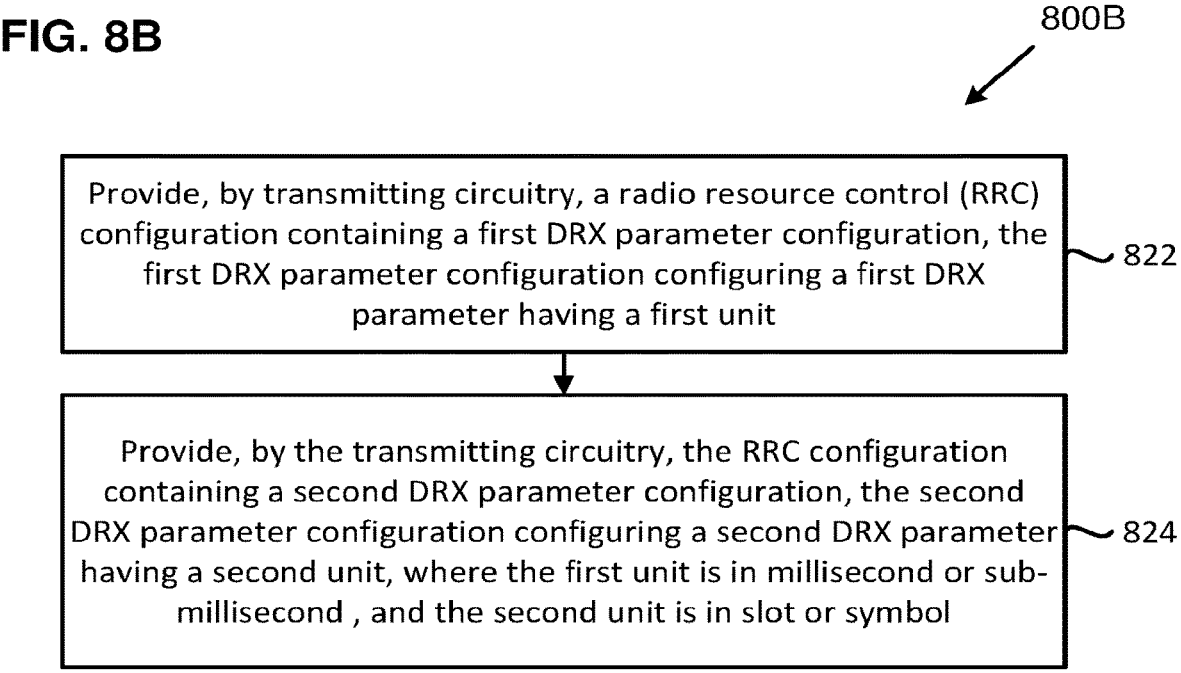
FIG. 8B is a flowchart illustrating a method by a base station for DRX operation, in accordance with an example implementation of the present application.

FIG. 8B is a flowchart 800B illustrating a method by a base station for DRX operation, in accordance with an example implementation of the present application. In the present implementation, the flowchart 800B includes actions 822 and 824. In action 822, the base station, using its transmitting circuitry, provides a radio resource control (RRC) configuration containing a first DRX parameter configuration, the first DRX parameter configuration configuring a first DRX parameter having a first unit. In action 824, the base station, using its transmitting circuitry, provides the RRC configuration containing a second DRX parameter configuration, the second DRX parameter configuration configuring a second DRX parameter having a second unit, where the first unit is in millisecond or sub-millisecond, and the second unit is in slot or symbol.

In some implementations, a first time length (duration) of the first unit is fixed, and a second time length (duration) of the second unit is scalable. In some implementations, the determination of the second time length (duration) of the second unit is based on a frame structure of a bandwidth part (BWP) in which the second DRX parameter is applied. In some implementations, the frame structure is determined based on subcarrier spacing. In some implementations, the first DRX parameter is a parameter with a FTU, such as $PWF_C$ or $PWF_T$ shown in Table 1. In some implementations, the second DRX parameter is a parameter with a STU, such as $PWS_C$ or $PWS_T$ shown in Table 1. In some implementations, the second time length (duration) of the second unit is scaled for each data transmission scheduling based on a BWP indicator and a pre-configured subcarrier spacing indicator for each configured BWP, as described herein.

In some implementations, the second DRX parameter is provided by the base station over a physical downlink control channel (PDCCH) or a group common (GC)-PDCCH. In some implementations, the second time length (duration) of the second unit is further based on slot/symbol format information (SFI) or radio resource format indication in the PDCCH or the GC-PDCCH. In some implementations, the first DRX parameter is configured based on an ON/OFF cycle of the DRX operation as described herein. In some implementations, the second DRX parameter is reconfigurable, and is provided by the base station during one or more ON cycles of the DRX operation as described herein. In some implementations, the base station provides the second DRX parameter in one or more subcarriers, subbands, or BWPs. In some implementations, the second DRX parameter is reconfigurable by the base station either periodically or for each data transmission scheduling.

Figure 9:
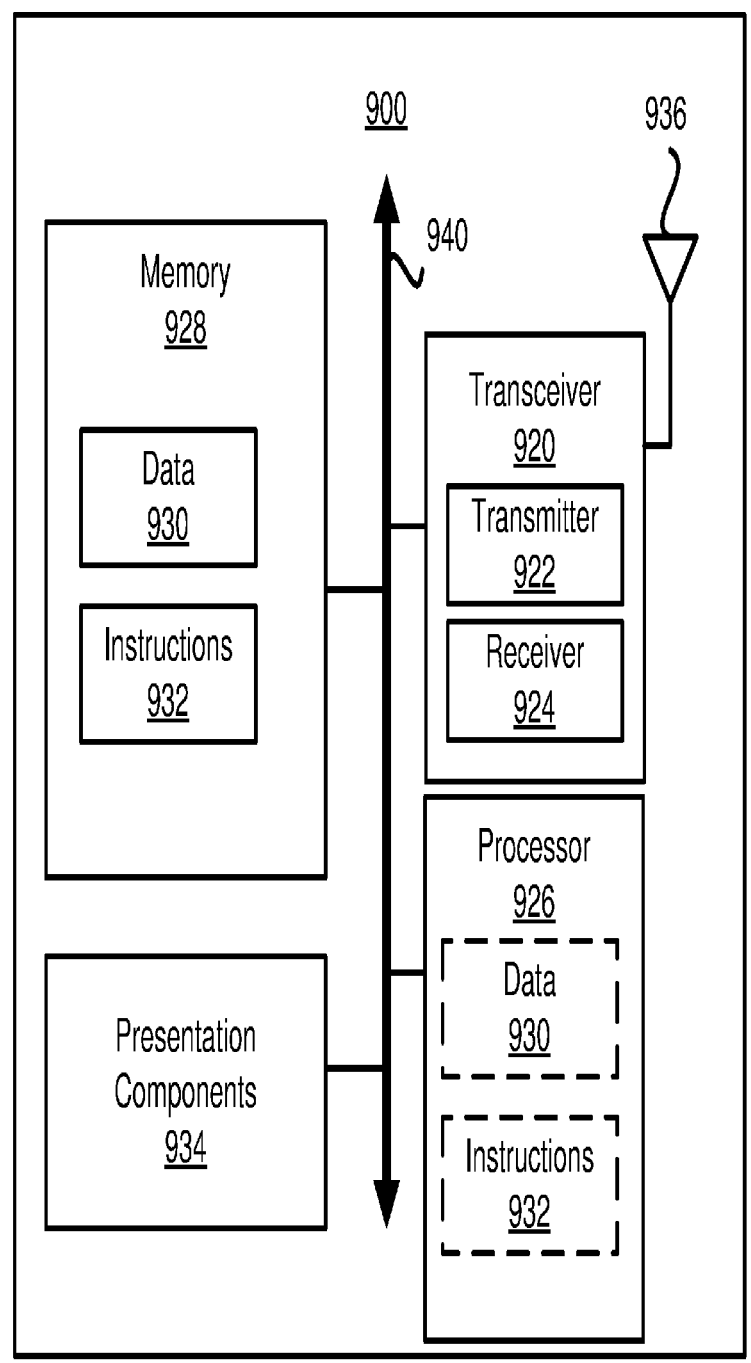
FIG. 9 is a block diagram illustrating a node for wireless communication, in accordance with an example implementation of the present application.

FIG. 9 illustrates a block diagram of a node for wireless communication, in accordance with various aspects of the present application. As shown in FIG. 9, a node 900 may include a transceiver 920, a processor 926, a memory 928, one or more presentation components 934, and at least one antenna 936. The node 900 may also include an RF spectrum band module, a base station communications module, a network communications module, and a system communications management module, input/output (I/O) ports, I/O components, and power supply (not explicitly shown in FIG. 9). Each of these components may be in communication with each other, directly or indirectly, over one or more buses 940. In one implementation, the node 900 may be a UE or a base station that performs various functions described herein, for example, with reference to FIGS. 1 through 8B.

The transceiver 920 having a transmitter (or transmitting circuitry) 922 and a receiver (or receiving circuitry) 924 may be configured to transmit and/or receive time and/or frequency resource partitioning information. In some implementations, the transceiver 920 may be configured to transmit in different types of subframes and slots including, but not limited to, usable, non-usable and flexibly usable subframes and slot formats. The transceiver 920 may be configured to receive data and control channels.

The node 900 may include a variety of computer-readable media. Computer-readable media can be any available media that can be accessed by the node 900 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 928 may include computer-storage media in the form of volatile and/or non-volatile memory. The memory 928 may be removable, non-removable, or a combination thereof. Exemplary memory includes solid-state memory, hard drives, optical-disc drives, and etc. As illustrated in FIG. 9, The memory 928 may store computer-readable, computer-executable instructions 932 (e.g., software codes) that are configured to, when executed, cause the processor 926 to perform various functions described herein, for example, with reference to FIGS. 1 through 8B. Alternatively, the instructions 932 may not be directly executable by the processor 926 but be configured to cause the node 900 (e.g., when compiled and executed) to perform various functions described herein.

The processor (or processing circuitry) 926 may include an intelligent hardware device, e.g., a central processing unit (CPU), a microcontroller, an ASIC, and etc. The processor 926 may include memory. The processor 926 may process the data 930 and the instructions 932 received from the memory 928, and information through the transceiver 920, the base band communications module, and/or the network communications module. The processor 926 may also process information to be sent to the transceiver 920 for transmission through the antenna 936, to the network communications module for transmission to a core network.

One or more presentation components 934 presents data indications to a person or other device. Exemplary presentation components 934 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for performing a discontinuous reception (DRX) operation, the method comprising:
receiving, at the UE, via a radio resource control (RRC) signaling, a first DRX configuration for configuring a first DRX parameter having a fixed time unit;
receiving, at the UE, via the RRC signaling, a second DRX configuration for configuring a second DRX parameter having a scalable time unit;
performing the DRX operation based on the configured first and second DRX parameters;
receiving downlink control information (DCI) that indicates a transport block reception on a bandwidth part (BWP); and
determining a time duration of the second DRX parameter based on a slot length of the BWP.

2. The method of claim 1, wherein the fixed time unit comprises one of a millisecond and a sub-millisecond, and the scalable time unit comprises one of a slot and a symbol.

3. The method of claim 1, wherein at least one of the first and second DRX parameters includes one of a drx-onDurationTimer, a drx-ShortCycle, a drx-LongCycleStartOffset, a drx-InactivityTimer, a drx-HARQ-RTT-TimerDL, a drx-HARQ-RTT-TimerUL, a drx-RetransmissionTimerDL, and a drx-RetransmissionTimerUL.

4. The method of claim 1, wherein receiving the second DRX configuration comprises receiving the second DRX configuration over one of a physical downlink control channel (PDCCH) and a group common (GC)-PDCCH.

5. The method of claim 4, wherein a time duration of the second DRX parameter is determined based on one of slot/symbol format information (SFI) and a radio resource format indication in one of the PDCCH and the GC-PDCCH.

6. The method of claim 1, wherein
the first DRX parameter is configured based on an ON/OFF cycle of the DRX operation; and
the second DRX parameter is reconfigurable, and is received by the UE during one or more ON cycles of the DRX operation.

7. A method for a base station for providing discontinuous reception (DRX) configuration to a user equipment (UE) to perform a DRX operation, the method comprising:
transmitting, by the base station, via a radio resource control (RRC) signaling, a first DRX configuration to the UE for configuring a first DRX parameter having a fixed time unit;
transmitting, by the base station, via the RRC signaling, a second DRX configuration for configuring a second DRX parameter having a scalable time unit, wherein the UE performs the DRX operation based on the configured first and second DRX parameters; and
transmitting downlink control information (DCI) that indicates a transport block reception on a bandwidth part (BWP), wherein the UE determines a time duration of the second DRX parameter based on a slot length of the BWP.

8. The method of claim 7, wherein the fixed time unit comprises one of a millisecond and a sub-millisecond, and the scalable time unit comprises one of a slot and a symbol.

9. The method of claim 7, wherein at least one of the first and second DRX parameters includes one of a drx-onDurationTimer, a drx-ShortCycle, a drx-LongCycleStartOffset, a drx-InactivityTimer, a drx-HARQ-RTT-TimerDL, a drx-HARQ-RTT-TimerUL, a drx-RetransmissionTimerDL, and a drx-RetransmissionTimerUL.

10. The method of claim 7, wherein transmitting the second DRX configuration comprises transmitting the second DRX configuration over one of a physical downlink control channel (PDCCH) and a group common (GC)-PDCCH.

11. The method of claim 10, wherein a time duration of the second DRX parameter is determined based on one of slot/symbol format information (SFI) and a radio resource format indication in one of the PDCCH and the GC-PDCCH.

12. The method of claim 7, wherein
the first DRX parameter is configured based on an ON/OFF cycle of the DRX operation; and
the second DRX parameter is reconfigurable, and is received by the UE during one or more ON cycles of the DRX operation.

* * * * *